Dec. 22, 1953 C. B. HIRSCH 2,663,416

RECORD HOLDER

Filed Jan. 28, 1948 3 Sheets-Sheet 1

INVENTOR.
Clifford B. Hirsch
BY Henry Price
ATTORNEY.

Dec. 22, 1953 C. B. HIRSCH 2,663,416

RECORD HOLDER

Filed Jan. 28, 1948 3 Sheets-Sheet 2

INVENTOR.
Clifford B. Hirsch
BY
[signature]
ATTORNEY.

RECORD HOLDER

Filed Jan. 28, 1948 3 Sheets-Sheet 3

INVENTOR.
Clifford B. Hirsch
BY
ATTORNEY.

Patented Dec. 22, 1953 2,663,416

UNITED STATES PATENT OFFICE 2,663,416

RECORD HOLDER

Clifford B. Hirsch, Hartford, Conn.

Application January 28, 1948, Serial No. 4,760

6 Claims. (Cl. 206—62)

The present invention relates to a record holder and it particularly relates to a holder for a set of phonograph records.

In present record holders the records are held in a plurality of envelopes or pockets open at one side, which may be enclosed in stiff covers. The records frequently fall out when the holder is inverted and are damaged or become cracked or broken.

It is among the objects of the present invention to provide a novel record holder which will hold either one or a set of records most securely, enabling ready packaging, shipping and handling which holder may be inexpensively manufactured in large quantities from readily available materials.

Another object is to provide a novel record holder designed to carry a set of records and securely retain them against damage and breakage when not in use and which at the same time will enable said records to be most readily removed as a set for playing upon a modern automatic type record changer phonograph and replaced in proper order from the turn-table of the machine into the record changer without separately removing or inserting each record in its individual envelope or pocket.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to form a relatively flat paper element having a record carrying recess with a centering element. The recess is preferably closed by a cover member, which will form a completely closed package having no openings at any side for the records to fall out.

The recess or pocket is sufficiently deep to receive a set of three to ten records and these are clamped down on a central spindle serving as the centering element by a compressible contact member, for example of sponge rubber.

In the preferred form the entire structure is made of laminated corrugated stock, or it may be folded out of thin paper board.

The invention also consists in certain new and original features of construction and combination of parts hereinafter set forth and claimed and as to its other objects, features and advantages, the mode of operation and manner of its organization, these, inter alia, may be better understood by referring to the following description considered in connection with the accompanying drawings forming a part thereof in which:

Fig. 1 is a top perspective view showing one embodiment of an open record with a central locating device and a record receiving recess;

Figs. 2 and 3 are fragmentary transverse vertical sectional views upon the lines 2—2 and 3—3 of Fig. 1 upon an enlarged scale as compared to Fig. 1;

Referring to the embodiments of Figs. 1 to 5 there is provided a cover section A and a base section B. The base section B receives the recessed enclosure C for the records and also the central movable or fixed spindle or locater D. The top cover section A receives the compressible sponge rubber pad E.

Figures 1, 2, 3, 4, 5:
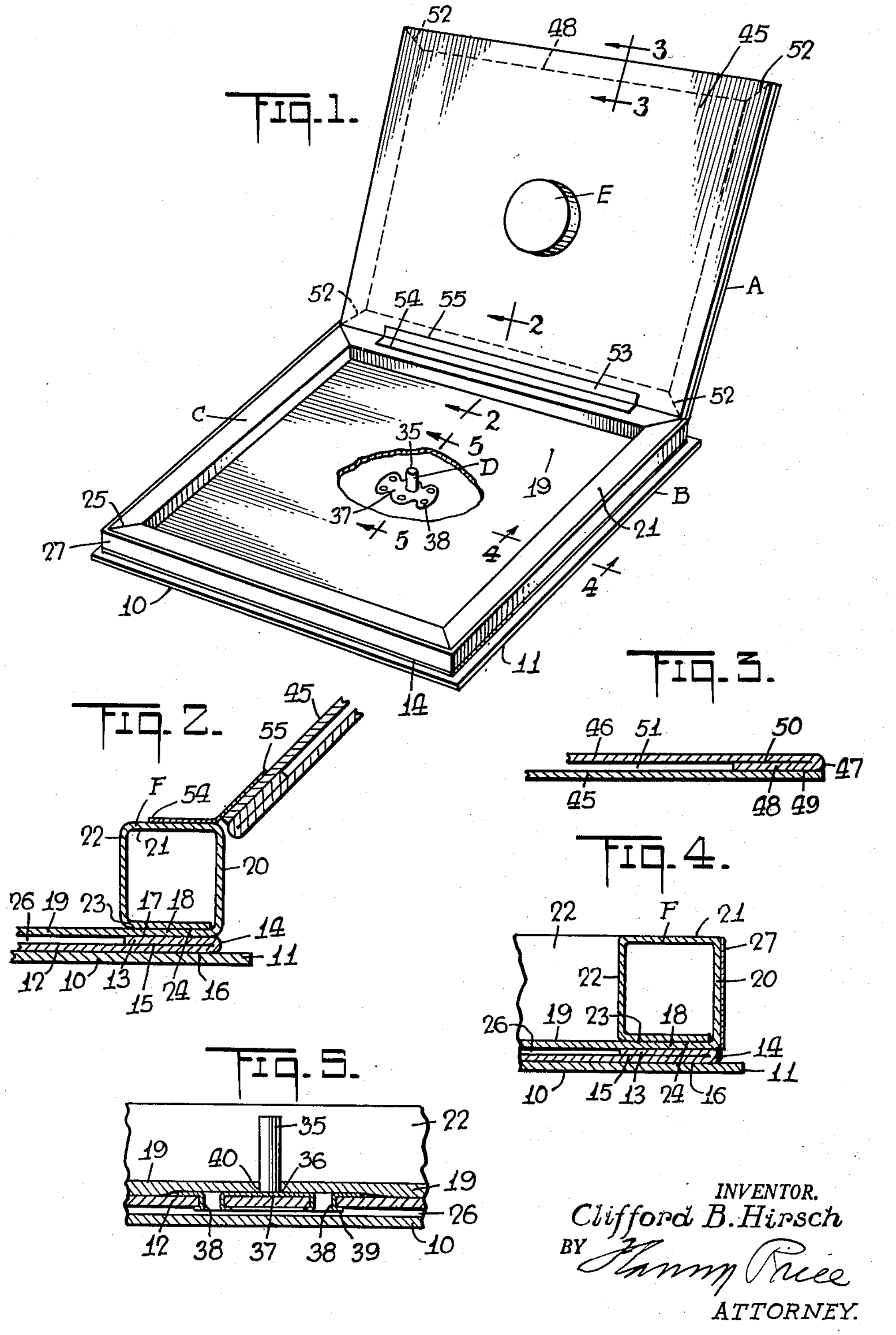
Fig. 4 is a fragmentary vertical sectional view upon the line 4—4 of Fig. 1 of the edge of the base element.
Fig. 5 is a fragmentary transverse vertical sectional view upon the line 5—5 of Fig. 1 and upon an enlarged scale as compared to Fig. 1 indicating the mounting of the central locating device.

The base structure as shown best in Fig. 2 has a base piece of cardboard or plastic 10 having the projecting edges 11 which carries the intermediate paper or plastic sheet 12. The sheet 12 has the inturned edges 13 making a fold 14. There is no adhesion at the contacting faces 15 of the fold 14.

There is adhesion by glue or resin at the contacting faces 16 and at the contacting faces 17 at the margin 18 of the inside paper or plastic sheet 19.

The inside cardboard paper or plastic sheet 19 adjacent the edge or margin is folded upwardly indicated at 20, inwardly at 21, downwardly at 22 and outwardly at 23. At 23 it is adhesively joined at 24 to the marginal edge 18 of the inner face 19.

The square cross section F thus formed provides the recess C. The square cross section F continues around the periphery of the base B and has the oblique joints 25 at the corners. The space 26 will form a resilient air pocket in the base B giving greater safety to the records enclosed therein.

The spindle D has a central post 35 which may be soldered (see Fig. 5) at 36 onto a base plate 37. The plate 37 has a plurality of downwardly projecting tangs 38. The tangs 38 are designed to be turned outwardly below the intermediate sheet 12 as indicated at 39 in Fig. 5. The post 35 will project upwardly through an opening 40 in the inside sheet 19. The attachment of the plate 37 will be concealed between the sheets 19 and 10.

The sponge rubber disk E may be glued or otherwise attached to the inside sheet 45 of the cover A. The cover A also has an outside sheet 46 bent inwardly at 47 to form the marginal edge portion 48. The edge portion 48 is adhesively connected at 49 to the sheet 45. The contacting faces 50 of the fold 47 are devoid of adhesive attachment.

This will give a resiliency to the cover A which will protect the records in the enclosure C. The air space 51 will aid the resiliency effect. The marginal portions 48 will meet at the obliquely cut corners 52 concealed between the sheets 45 and 46.

The hinge element 53 may extend as an extra sheet over the entire area of faces 45 and 21. As shown the strip hinge element 53 merely serves as a partial connection terminating at 54 and 55.

Referring to the embodiments of Figs. 6 to 9, the base section G is closed by the cover H having the central locating spindle J and the sponge pad K, the lock M assures closure of the sections.

Figure 9:
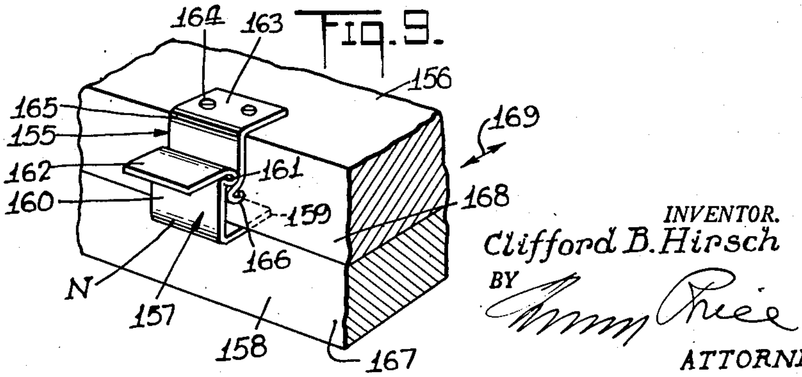
Fig. 9 is a fragmentary side perspective view showing an alternative latch arrangement upon an enlarged scale.

The lock N may also take the form as indicated in Fig. 9.

Figures 6, 7, 8:
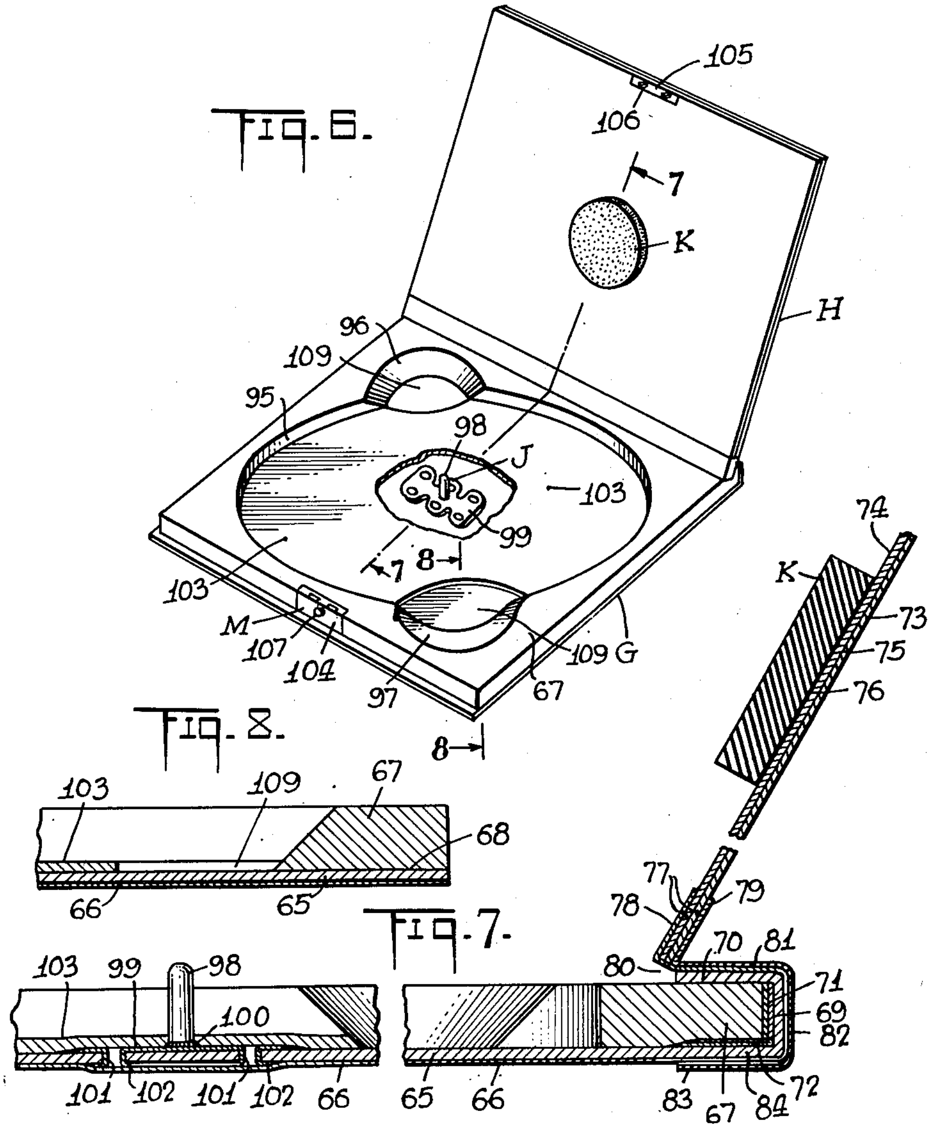
Fig. 6 is a top perspective view similar to Fig. 1 of an alternative embodiment of the record holder in open position.
Fig. 7 is a fragmentary transverse vertical sectional view upon the line 7—7 of Fig. 6 upon an enlarged scale as compared to Fig. 6.
Fig. 8 is a transverse vertical sectional view upon the line 8—8 of Fig. 6 of a corner of the record holder of Fig. 6 upon an enlarged scale as compared to Fig. 6.

As shown in Figs. 7 and 8, there is a base sheet 65 which may be covered by a thin paper facing 66. The plastic or paper framing material 67 may be adhesively connected at 68 to the base sheet 65. The base sheet 65 may be turned upwardly at 69 (see Fig. 7) and inwardly at 70 to engage the margins of the recessed element 67. The folded edge strips 71 and 72 are inserted between the material 67 and periphery of the base sheet 65. The cover H may consist of an outer sheet of paper or plastic 73 and an inner sheet 74 adhesively joined at 76.

To the marginal portion 77 of the double sheet 73—74 is adhesively connected the inner hinging sheet 78 and the outer hinging sheet 79. The inner hinging sheet 78 passes at 80 over the inside edges of the double sheet 73—74. It then continues at 81 over the section 70, at 82 over the section 69 and at 83 over the section 84, of the face sheet of paper or plastic 65.

The member 67 is circularly recessed at 95 to receive the flat circular records and it has the removed portions 96 and 97 enabling the hands of the user to be readily placed inside the recess 95 to grasp the pile of records.

The central post 98 may be attached by welding or soldering at 100 (see Fig. 7) to the base plate 99. The plate 99 has the tangs 101 turned under as indicated at 102 to engage the sheet 65. The tangs 102 are concealed by the paper facing 66. At the top, the plate 99 may be concealed by the insert sheet 103 fitting in the recess 95. The insert sheet 103 is recessed at 109 adjacent the removed portions 96 and 97.

The lock M has a female element 104 and a male element 105 with the latch teeth 106. The element 104 has the unlatching button 107.

The alternative latch as shown in Fig. 9 consists of an upper latch element 155 attached to a cover portion 156 and a lower latch 157 attached to a base section 158. The lower latch element 157 is connected by the flange 159 to the base section 158. The lower latch element 157 has an upturned portion 160 with an inturned latching round 161. The latching round has a finger contact portion 162.

The upper latching element 155 has a flange 163 riveted or screwed in position at 164 with a down turned portion 165 and a forward extending round portion 166. The vertical sections 160 and 165 are positioned substantially forward of the front edges 167 and 168 of the cover elements 158 and 156. The sections 160 and 165 are sufficiently resilient so as to be capable of backward and forward movement as indicated by the double arrow 169. Normally however, they will tend to assume vertical position which will cause substantially permanent engagement of the members 161 and 166.

In the embodiment of Figs. 10 to 14 both the base R and the cover S are formed of double sheets of corrugated board 120 and 121 for the base R and 122 and 123 for the cover S. The air spaces between the corrugations give the necessary resiliency.

If desired the corrugations of the joined elements 120 and 121 and 122 and 123 may be transversely disposed in respect to each other. The inside surfacing sheet 124 of the base R may be continuous with the inside surfacing sheet 125 of the cover S as shown at 126 in Fig. 14.

If desired an extra section 127 serving as a hinging sheet (see Fig. 11) may be employed with a hinging portion 128. This strip 127 may terminate at 129 and at 130.

The adjacent cover sheets of the boards 120 and 121 are adhesively joined at 131 in the base R and the adjacent cover sheets of the boards 122 and 123 at 132 in the cover S. The central portions of the sheets 120 and 122 are circularly recessed as indicated at 140 and 141. The edge of the recessing is oblique as indicated best in Fig. 11.

The center of the recess 140 receives the spindle 142 mounted upon the base plate at 143 and having the tangs 144 which fit under and engage the corrugated sheet 121 as indicated at 145.

The sponge rubber member 146 is centrally and adhesively attached at the base of the recess 141 to the inside face 147 of the sheet 123. The entire corrugated material as shown in Figs. 10 to 14 may be provided with a thin decorative covering sheet to get a finished record holder.

The recessed members may be sufficiently deep to carry six records, but it may be made of varying depths to accommodate any number of records varying from one to ten.

The elements A, B, G, H, R and S may be made of single sheet or multi-sheet thin cardboard, corrugated board, plastic or even light-weight metal.

Figures 10, 11, 12, 13, 14, 15:
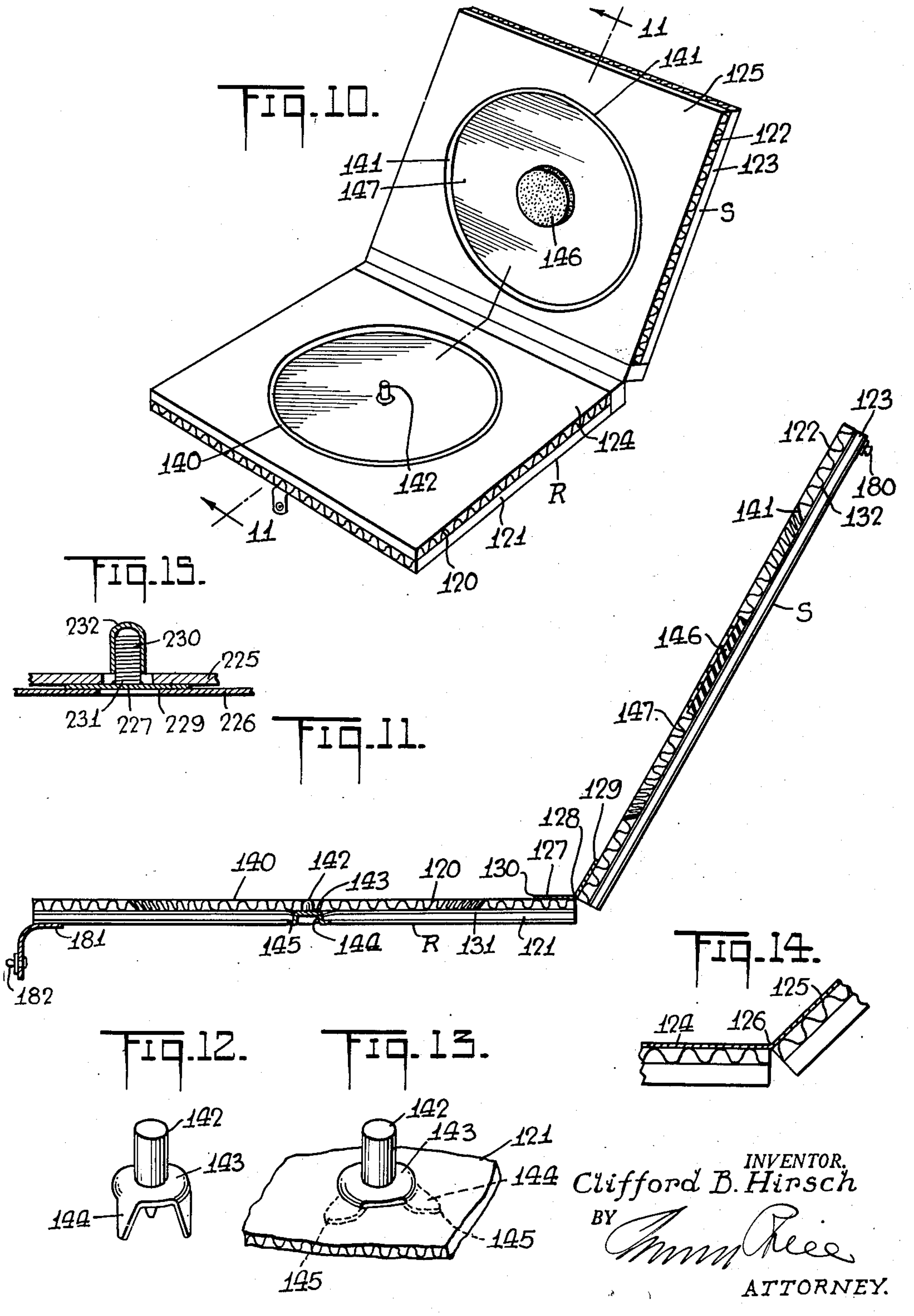
Fig. 10 is a top perspective view similar to Fig. 1 of still another alternative embodiment showing the record holder in open position.
Fig. 11 is a transverse vertical sectional view upon the line 11—11 of Fig. 10 upon an enlarged scale as compared to Fig. 10.
Fig. 12 is a fragmentary top perspective of the centering or spindle element of Fig. 10 before assembly with the record holder of Fig. 10 upon an enlarged scale as compared to Fig. 1.
Fig. 13 is a fragmentary enlarged perspective view similar to Fig. 12 after the centering or spindle element has been inserted into the corrugated board.
Fig. 14 is a transverse vertical fragmentary sectional view showing an alternative body arrangement.
Fig. 15 shows an alternative form of centering device.

In Fig. 15 is shown an alternative form of centering device. The spring 230 is covered by the cap 232 and has sufficient side-ward give to permit slight play or off-centering of the records and to adjust itself to records which may be inserted or removed in off-center position.

The cap 232 terminates above the lower end 231 of the spring 230 which is soldered to the metal plate 227. The plate 227 is held in position between the paper or plastic inside and outside sheets 225 and 226 respectively. If desired, the plate 227 may be permitted to move between the sheets 225 and 226, but preferably it is stapled or cemented in position. The bottom of the plate 227 is open at 229.

As many changes could be made in the above record holder and many apparently widely different embodiments of this invention could be made without departing from the scope of the claims, it is intended that all matter contained in the above description or shown in the accompanying drawings shall be interpreted as illustrative and not in a limiting sense.

Having now particularly described and ascertained the nature of the invention, and in what manner the same is to be performed, what is claimed is:

1. A paper record holder comprising a laminated sheet paper cover, a laminated backing paper element having a central recess to closely fit and receive a set of records, a central spindle centrally to position said records and a compressible sponge rubber pad to clamp said records in said recess when the cover is closed, said cover and backing element being formed of corrugated board and the cover sheet of the corrugated board extending from the inside face of the cover onto the inside face of the backing element and serving as a hinge connection between the cover and the backing element.

2. A corrugated board record album comprising a corrugated paper base having an annular structure mounted thereon to form a circular recess to receive the records and side recesses to provide for insertion of the hands and lifting and grasping of the records, a post mounted centrally in the bottom of said recess and projecting upwardly through the center openings in said records and a corrugated board cover having a central sponge rubber pad to press down upon said post and said records and prevent them from breaking and movement during handling, shipment and merchandising.

3. The album of claim 2 in which the base and cover each consist of two layers of corrugated paper board and in which the inside surfacing sheet of the inner layers of corrugated board extends continuously from the base to the cover to form a hinge.

4. A corrugated paper disk record holder and shipping container formed of a rectangular multi-ply top hinged cover member with a central circular sponge rubber pad attached to the inside center thereof, a lower centrally recessed multi-ply base container member, one side edge of which is hinged to said top hinged cover, a central post having a flat plate base, said base being mounted centrally and extending between the plies of said base and the upper end of said post contacting the center of said pad when the holder is closed, said records being held centrally upon said post and being resiliently clamped between said corrugated plies and said sponge rubber pad.

5. The holder of claim 4, said central post being formed of a closely wound coil spring and a metal cylinder fitted upon said coil spring.

6. The holder of claim 4, said plies and said container member and said cover member having corrugations transversely disposed in respect to each other in the different plies.

CLIFFORD B. HIRSCH.

References Cited in the file of this patent

UNITED STATES PATENTS

| Number | Name | Date |
|---|---|---|
| 407,957 | Kookogey | July 30, 1889 |
| 479,999 | Thompson | Aug. 2, 1892 |
| 619,097 | Steffens | Feb. 7, 1899 |
| 774,037 | Burgi | Nov. 1, 1904 |
| 964,216 | Collins | July 12, 1910 |
| 1,057,671 | Rogers | Apr. 1, 1913 |
| 1,585,846 | Frisbie | May 25, 1926 |
| 1,756,135 | Ruskin | Apr. 29, 1930 |
| 1,879,029 | Baumgard | Sept. 27, 1932 |
| 1,986,421 | Windfuhr | Jan. 1, 1935 |
| 2,001,820 | Irelan et al. | May 21, 1935 |
| 2,279,426 | Walsh | Apr. 14, 1942 |
| 2,308,871 | Fenton | Jan. 19, 1943 |
| 2,427,420 | Rhodes | Sept. 16, 1947 |
| 2,494,359 | Roth | Jan. 10, 1950 |

FOREIGN PATENTS

| Number | Country | Date |
|---|---|---|
| 177,309 | Great Britain | Mar. 30, 1922 |
| 206,017 | Canada | Nov. 30, 1920 |
| 592,531 | France | Aug. 4, 1925 |